(12) United States Patent (10) Patent No.: US 7,432,483 B2
Wilson (45) Date of Patent: Oct. 7, 2008

(54) CONTINUOUS FEED VOLUMETRIC HEATING AND CONVECTION OVEN

(75) Inventor: Robert B. Wilson, Overland Park, KS (US)

(73) Assignee: Flint Hills Foods, LLC, Wamego, KS (US)

( * ) Notice: Subject to any disclaimer, the term of this patent is extended or adjusted under 35 U.S.C. 154(b) by 149 days.

(21) Appl. No.: 11/189,994

(22) Filed: Jul. 26, 2005

(65) Prior Publication Data

US 2007/0023413 A1 Feb. 1, 2007

(51) Int. Cl.
H05B 6/78 (2006.01)
F27B 9/06 (2006.01)
F27B 11/00 (2006.01)
F26B 3/34 (2006.01)

(52) U.S. Cl. .................... 219/700; 219/388; 34/262
(58) Field of Classification Search .............. 219/700, 219/701, 702–704, 709, 717, 741, 757, 679, 219/752, 699; 426/467, 496, 503; 34/262
See application file for complete search history.

(56) References Cited

U.S. PATENT DOCUMENTS

| | | | |
|---|---|---|---|
| 2,346,232 A | 4/1944 | Piret et al. | |
| 2,502,115 A | 3/1950 | Zimmermann | |
| 3,564,187 A * | 2/1971 | Smith | 219/699 |
| 4,074,357 A | 2/1978 | Szczezesniak et al. | |
| 4,265,918 A | 5/1981 | Kueper et al. | |
| 4,450,183 A | 5/1984 | Steinberg et al. | |
| 4,746,522 A | 5/1988 | Wofford et al. | |
| 4,957,756 A | 9/1990 | Olander et al. | |
| 5,071,666 A | 12/1991 | Handel et al. | |
| 5,356,647 A | 10/1994 | Mason et al. | |
| 5,547,373 A * | 8/1996 | Snell | 432/72 |
| 5,567,460 A | 10/1996 | Afman | |
| 5,830,525 A | 11/1998 | Cozzini et al. | |
| 5,997,925 A | 12/1999 | Wilson et al. | |
| 6,214,292 B1 | 4/2001 | Las Navas Garcia | |
| 6,233,841 B1 * | 5/2001 | Beach | 34/262 |
| 6,669,974 B2 | 12/2003 | Weldy et al. | |
| 6,723,206 B1 | 4/2004 | Fransson et al. | |
| 7,022,957 B2 * | 4/2006 | Bakanowski et al. | 219/741 |

\* cited by examiner

*Primary Examiner*—Quang T Van
(74) *Attorney, Agent, or Firm*—Hovey Williams LLP (57) ABSTRACT

A continuous feed volumetric heating and convection oven for heating articles includes an oven body, a conveyor for moving the articles therethrough, a volumetric heating source for delivering microwave or other volumetric heating energy to the oven body, and a ventilation system for delivering a flow of heated air to the oven body. The ventilation system includes a heater and at least one damper associated with an exhaust whereby air may be partially recirculated and partially exhausted from the oven body. Microwave chokes and microwave suppression tunnels are provided for limiting the escape of volumetric heating energy such as microwave energy into the surrounding area and into the ventilation system.

2 Claims, 5 Drawing Sheets

CONTINUOUS FEED VOLUMETRIC HEATING AND CONVECTION OVEN

BACKGROUND OF THE INVENTION

1. Field of the Invention

The invention hereof is directed to a combination volumetric heating, such as microwave energy, and convection oven having a continuous feed of articles therein to rapidly heat articles placed therein. More particularly, the oven hereof includes a ventilation system having a controllable exhaust to sufficiently reduce buildup of condensate within a cavity of the oven while maintaining effective convection heating and limiting escape of microwaves into the environment.

2. Description of the Prior Art

It is sometimes desirable to subject a commercial product to heating prior to delivery to a commercial establishment or the consumer. As an example, meats such as bacon may be partially or fully cooked during processing prior to packaging and delivery to the consumer. While traditionally bacon processing has included a smokehouse curing segment, it is a goal to retain the "smokehouse" flavor without the long curing times associated with such curing. Thus, various curing or treatment processes for processed meats seek to eliminate this step by substituting alternative curing procedures, sometimes reducing the organoleptic qualities of the product. Cooking the bacon at the processing facility reduces the amount of cooking or heating necessary by a restaurant or consumer in the kitchen. In circumstances where food must be quickly and also safely prepared, commercial cooking of meat at the processing facility may not only enhance the desirability of the product from the standpoint of reduced preparation time, but may reduce total energy consumption by reducing the amount of energy necessary to cook the meat to table readiness when consumers as a whole are considered. Thus, partially or fully cooked meats, and in particular individual slices of bacon, may be rapidly heated to table readiness by a variety of conventional means without the necessity of fully cooking the cured bacon by the consumer.

A variety of different processes have heretofore been developed for curing or pre-cooking meat in a commercial facility. Such processes are broadly described in U.S. Pat. Nos. 4,957,756, 5,067,460, and 5,997,925 with respect to meat, and in particular bacon, and the disclosures thereof are incorporated by reference herein.

However, a number of challenges are presented by heating articles, and in particular cooking meat such as bacon in a continuous commercial oven. One such problem is the desire to reduce energy demands by retaining or recirculating air within the oven, and the countervailing concern that by such retention or recirculation, vapors driven from the heated article such as meat grease will condense within the oven and on the meat or other article, which may degrade the quality of the article. Another challenge is the need to control temperature and humidity within the oven to provide adequate quality control, while at the same time providing for continuous conveyance of the articles into and out of the oven, and possibly introduce moisture or flavorings into the oven cavity. Moreover, the continuous cooking of meats in particular results in a large volume of liquid grease which must be adequately handled.

As a result, there has developed a need for an improved continuous oven which provides rapid and thorough heating of articles placed therein.

SUMMARY OF THE INVENTION

These challenges and others are largely met by the continuous feed volumetric heating and convection oven of the present invention. Volumetric heating is provided by supplying electromagnetic energy in the microwave or radiofrequency wavelengths, and microwave energy is the most preferred source of volumetric heating in the oven hereof. The use of both volumetric heating and convection cooking provides rapid and thorough heating of articles, and for example provides both internal volumetric heating as well as surface heating which can serve to brown the exterior of a food article. One useful application involves the partial or full-cooking of meat and in the oven of the present invention, the use of both volumetric and convection heating can be controlled to an extent determined by a number of factors such as volumetric heating energy, airflow, oven temperature, and retention time in the oven according to the articles to be heated and the amount of heating desired. In the case of meats, desirable organoleptic qualities of the partially or fully cooked meat are provided by the use of both microwave and convection heating, enhanced by the ventilation control features and the ability to introduce moisture or flavorings provided by the preferred embodiments.

Broadly speaking, the oven of the present invention includes a body presenting a cavity adapted to receive articles to be heated therein. A conveyor is oriented to move the articles into and out of the oven cavity. At least one volumetric heating source, such as those providing radiofrequency or microwave energy from a transmitter directs microwave energy into the cavity of the oven body. A convection heating source is fluidically coupled to the cavity, and a ventilation system is provided to exhaust air from the cavity. The ventilation system includes at least one exhaust duct having a damper therein. The damper may be adjusted to regulate the temperature and humidity within cavity, and preferably the adjustments are automatically made according to temperature and humidity sensors positioned within the chambers operatively coupled to PLC controllers and to servo motors, extensible arms, or other motive members operatively coupled to the dampers. Preferably, the ventilation system recirculates at least a portion of the exhausted air back into the cavity, and the damper within the exhaust duct is automatically controllable based on sensed temperature and humidity within the cavity. Moreover, the challenges presented by the combination of continuous processing, microwave heating, and convection heating have been addressed in the preferred embodiment of the present invention by a system of microwave chokes to inhibit the escape of microwaves to the surrounding environment and into the ventilation system.

In preferred embodiments, the conveyor is provided as at least one belt having openings, and most preferably a pair of such belts which are positioned in upper and lower positions with the articles to be heated located therebetween. The belts are microwave compatible as well as adapted for use in a heated environment, and convey the articles longitudinally from an input end of the body to an output end. Preferably, the lower belt is substantially located within the cavity both in a product advancing area as well as a return area to minimize the need for external drip pans. This positioning advantageously reduces thermal shock or variable expansion of the belt as it passes into and out of the cavity by keeping the lower belt within a narrower temperature range environment for most of the cycle of the belt.

The oven hereof may be particularly adapted for specific applications by the ability to introduce moisture or flavorings into the cavity. This may be especially desirable in the case of bacon or other processed meats where traditional methods, such as smokehouse curing, have been eliminated prior to the full or partial cooking process. Thus, live steam, liquid smoke, or other flavor enhancers may be introduced into the cavity by humidifiers in the intake side of the ventilation system or sprayers for delivering a liquid spray directly into the cavity.

Finally, and in alternate embodiments, the body of the oven may be segmented into a plurality of chambers, each having a separate cavity which sequentially receive the article as it moves along the oven. Preferably, the chambers are connected continuously, and each includes at least an individual intake and exhaust, or plurality of exhausts, each exhaust having a separate, controllable damper. In addition to the exhaust(s) for recirculation of the air, a separate discharge duct may be provided for each chamber, the discharge duct being separate from the exhaust(s) to discharge a portion of the air from each cavity to the atmosphere. The provision of the discharge duct for each chamber permits the introduction of new air into the cavity or cavities, thereby reducing or avoiding retention and buildup of vapors or condensates within body. By providing a number of air exchanges within the cavity or cavities of the body, improved convection heating is achieved, grease or other deposit buildup is reduced, without substantial sacrifice of efficiencies gained by recirculating properties of the ventilation system. As a result, an efficient oven is provided which, in the case of meats such as bacon, produces an edible, organoleptically acceptable food item.

These and other advantages and features of the present invention will be readily appreciated by those skilled in the art with reference to the accompanying drawings and the detailed description of the preferred embodiments.

DESCRIPTION OF THE PREFERRED EMBODIMENT

Referring now to the drawings, a continuous feed microwave and convection oven 10 in accordance with the present invention broadly includes a body 12 for receiving therein articles to be heated, a conveyor 14 for moving articles into and out of the oven body 12, a volumetric heating source such as a microwave source 16 for delivering microwave energy to the oven body 12, and a ventilation system 18 for delivering a flow of heated air to the oven body and recirculating a portion of the air delivered to the oven body 12. The oven body 12 has a cavity 20 therein into which articles are carried by the conveyor 12 for heating. Articles 22, such as bacon sides which may be in slab or sliced form, or other food or non-food items, are heated where they may be partially or fully cooked by volumetric and convection heating. While the invention is described in further detail with respect to the cooking of meat, it is to be appreciated that other materials may be heated by the invention hereof, for example asphalt, and that the oven of the present invention broadly includes the heating of articles moved therethrough. Also, while microwave energy has been found to be a satisfactory source for volumetric heating, other volumetric heating energies such as radio frequency energy would be useful herein. For ease of explanation, however, microwave energy will be used herein as the example of volumetric heating.

Figure 2:
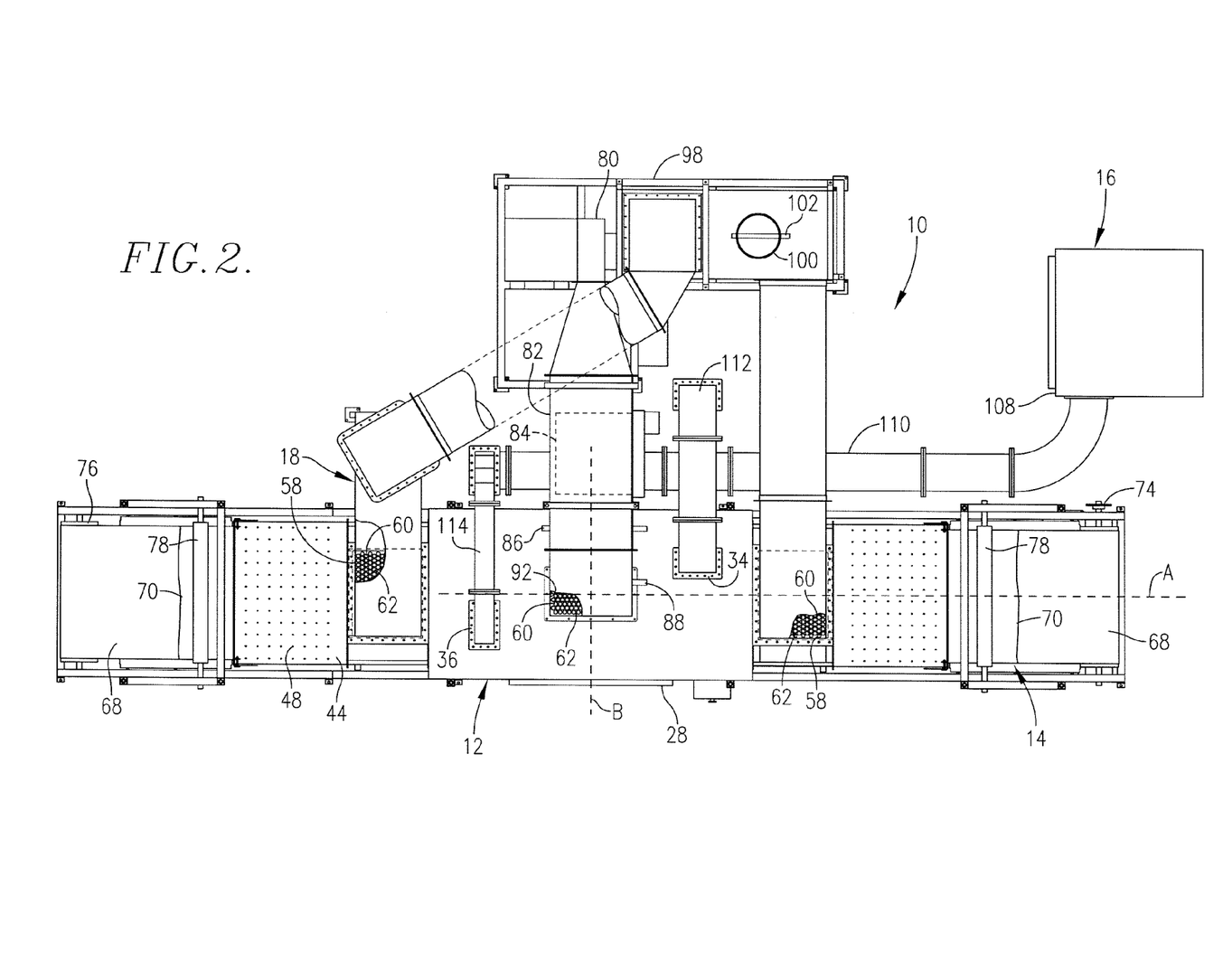
FIG. 2 is a top plan view thereof, showing the convection heater as part of the ventilation system, and the microwave passage leading to the waveguide mounts on the oven body, with portions of the upper belt of the conveyor broken away to show suppression tunnels at the entrance and exit ends of the body, and portions of the ducting broken away to show the microwave chokes.

In greater detail, the oven body 12 is mounted on a frame 24 which supports the oven body 12 above a supporting surface such as a floor 26 or the like. The oven body 12 is preferably constructed of stainless steel to facilitate cleaning, and may be provided with a door 28 on one side thereof for access into the cavity 20. The oven body is elongated in the direction of movement of the articles along the conveyor 24, and may be generally rectangular in plan. A longitudinally extending plane A thus bisects the oven body 12 along its longitudinal axis, and a transverse plane B bisects the oven body 12 in a direction normal to the longitudinal plane A as may be seen in FIG. 2. The body 12 presents an upstream end 30 and a downstream end 32. In order to admit microwave energy into the oven cavity 20, the body includes a plurality of microwave ports 34 and 36. One of the ports 34 is positioned on the upstream side of the plane B and on the remote side of the longitudinal plane A relative to the door 28, while the other port 36 is positioned on the downstream side of the plane B and on the proximate side of the longitudinal plane A relative to the door 28. Furthermore, the one port 34 is elongated in a longitudinal direction and the other port 36 is elongated in the transverse direction as may be seen in FIG. 2. This placement and orientation of the microwave ports 34 and 36 provides improved distribution of the microwave energy entering the oven cavity.

Figure 5:
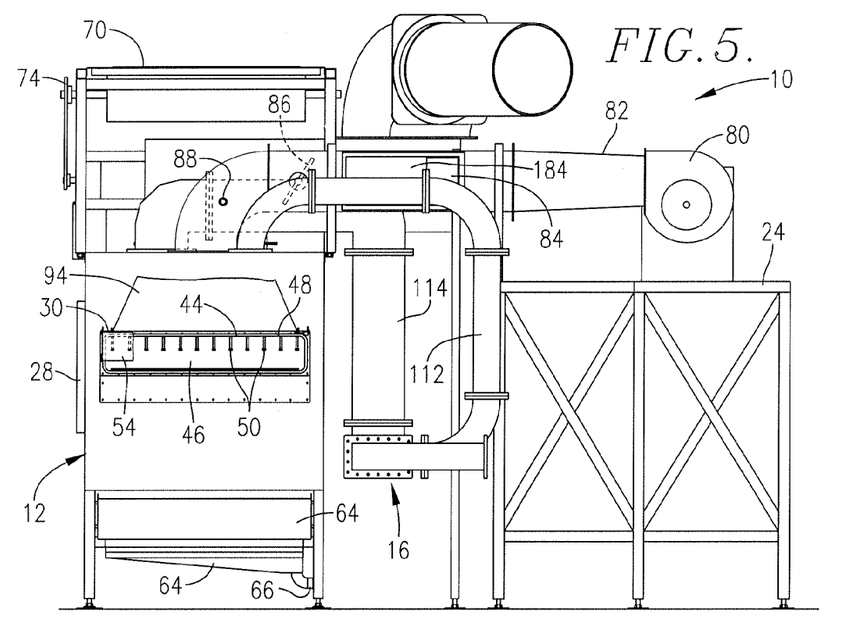
FIG. 5 is a vertical cross-sectional view taken along line 5-5 of FIG. 1, with a portion of the suppression tunnel broken away to show the microwave choke therein, and a pipe for introducing liquid into the heated air flow into the cavity of the body.

In addition, the oven body includes a pair of microwave suppression tunnels 38 and 40 located respectively at the upstream and downstream ends of the body 12. Each suppression tunnel 38, 40 presents a shallow tunnel section 42 of stainless steel or the like having a generally rectangular upper panel 44. Microwave energy is inhibited from escaping through a tunnel opening 46 through which the articles pass along the conveyor by a microwave suppressor 48 mounted on the upper panel 44, the suppressor including a plurality of upright pins 50 mounted to depend from the upper panel 44 as may be seen in FIG. 5. Furthermore, an opening guard 52 is adjustably mounted to the tunnel opening side of the tunnel section 42 and includes a guard plate 54 carried by side panels having a slot therein. The guard plate 54 extends across the tunnel opening 46 and may be pivoted and held in position by a thumbscrew 56 passing through the slot to clamp the opening guard in the desired position. Each of the suppression tunnels 38, 40 of the oven body 12 further includes vent exit openings 58 to permit air to flow from the cavity 20 within the body 12. The vent exit openings 58 are provided with microwave chokes 60, here provided as metal mesh screens 62 which restrict transmission of microwave energy through the ventilation system. The vent exit openings 58 are preferably located respectively longitudinally outboard of the microwave ports 34, 36 relative to the plane B and longitudinally inboard of the microwave suppressors 48.

The body 12 is provided with openings in its underside so that drip pans 64 carried by the frame may receive and contain drippings produced by the heating of the articles 20. The drip pans 64 may then drain to an external drain by passage 66 for processing the drippings for disposal or further use. The drip pans 64 preferably extend substantially the length of the conveyor 14 and are positioned therebeneath.

The conveyor 14 preferably includes a lower belt 68 and an upper belt 70 positioned in superposed relationship to the lower belt. The belts 68 and 70 are preferably of PTFE coated fiberglass and resin or of a synthetic resin material such as polyethersulfone or the like which is heat and microwave resistant, and are presented as a grid or otherwise perforated having openings therein to facilitate the passage of drippings or the like therethrough. The lower belt 68 and upper belt 70 are both endless belts such that an advancing portion 72 is positioned to pass through the suppression tunnels and cavity and a return portion 73 which may either pass through the cavity (as shown with respect to the lower belt 68 in FIGS. 6 and 7) or outside the body 12. The belts 68 and 70 are flexible, and the spacing therebetween is relatively narrow in regard to the advancing portions 72 passing through the oven cavity such that articles 22 placed on the lower belt 68 are substantially held in position between the belts 68 and 70 to inhibit dislodgment within the cavity. Advantageously, the more the belts 68 and 70 are located within the cavity and subject to the hot air therein, the less the belts 68 and 70 are subjected to thermal shock due to cooling and heating caused by passage inside and outside the cavity. As may be seen in the drawings, the conveyor includes motor drives 74, tensioners 76 and idler pulleys 78 for each of the belts 68 and 70.

Figure 3:
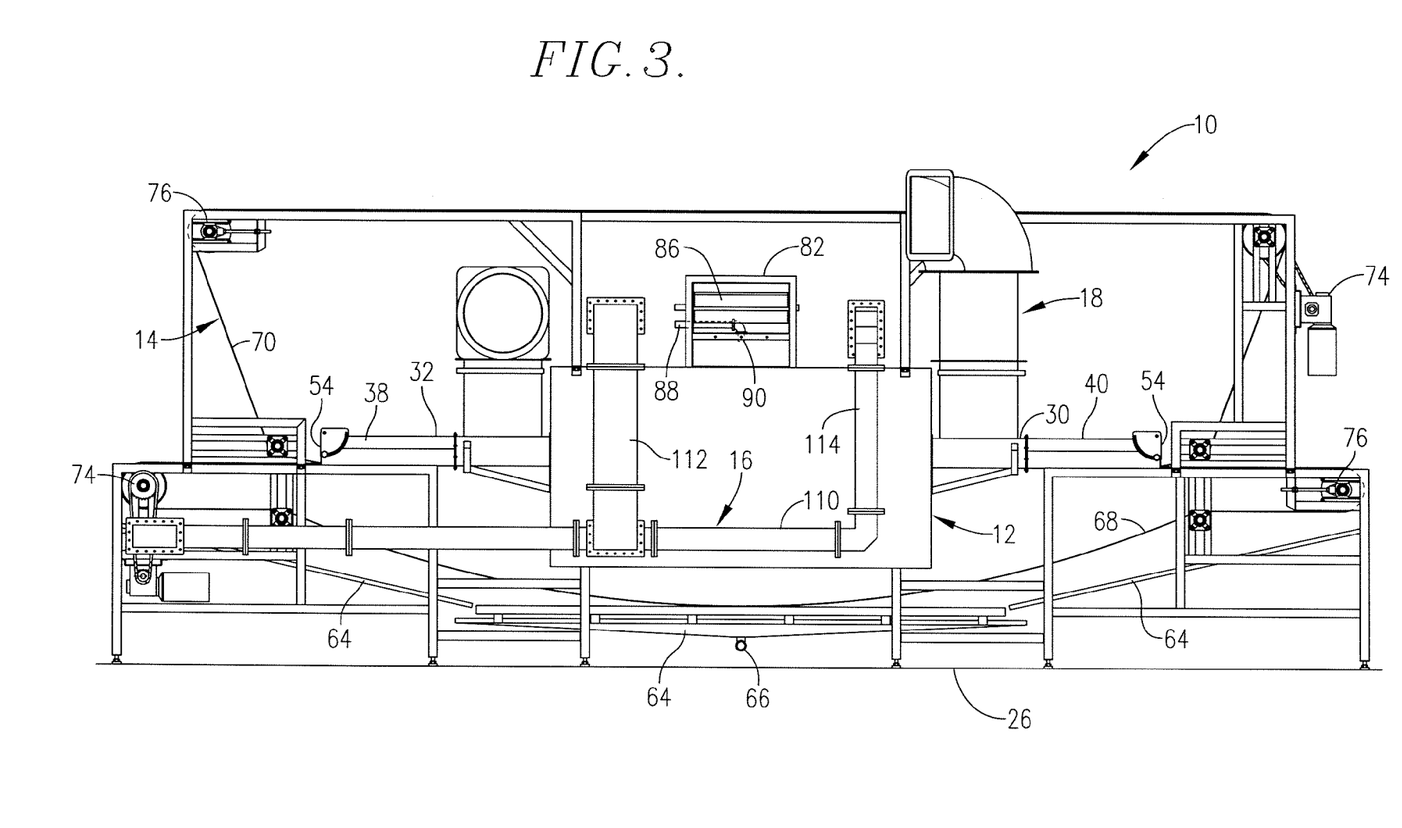
FIG. 3 is a rear elevational view thereof, showing the microwave passage and a damper positioned in the intake duct of the ventilation system.
Figure 4:
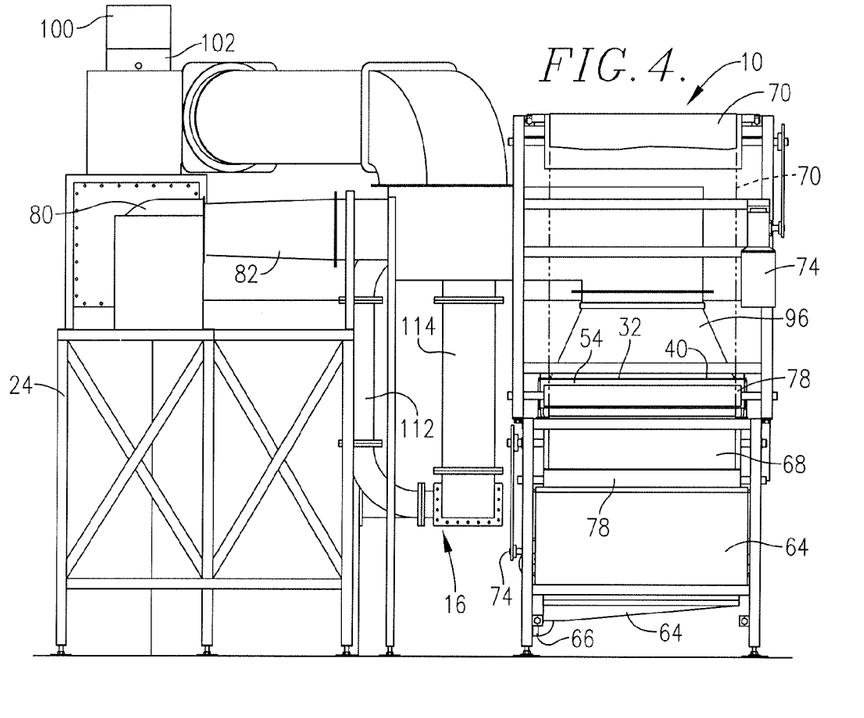
FIG. 4 is a left end elevational view thereof with portions of the upper belt of the conveyor broken away, showing the return air duct, the heat inlet duct, and the exhaust from the ventilation system.

The ventilation system 18 permits circulation of the air within the cavity to promote convection heating. Air is initially driven by a fan 80 into an air inlet duct 82 having a heater 84 therein. While in the embodiment shown, the heater is an electric heater positioned in the air inlet duct, it may be appreciated that other heaters, such as gas or oil fired forced air heaters or heat exchangers connected to a steam generator or the like, may be used. One heater suitable for use in the present application is a Chromalox 50 kW heater which has a thermocouple positioned downstream in the air inlet duct for sensing the temperature of the air entering the cavity 20. The flow of heated air in the air inlet duct may be controlled by a damper 86 which may be controlled by a driven member such as an extensible arm, solenoid or the like. The inlet duct 82 also includes a conduit 88 for the delivery of moisture in the form of a spray or steam into the cavity 20, although smoke or flavoring sprays including moisture could also be delivered by the conduit 88 which may be provided with a disperser 90 as shown in FIG. 3. The air inlet duct 82 fluidically connects with the body 12 by an inlet opening 92 which, like the exit openings, is provided with a microwave choke 60 in the form of screens 62 to inhibit the passage of microwaves therepast and into the air inlet duct 82. The air inlet opening 92 is preferably centrally positioned relative to the body 12 as shown in FIG. 3, such that the air enters the cavity substantially at the intersection of the longitudinal axis or plane A and the transverse axis or plane B. Heated air entering the body 12 then circulates within the cavity 20 and exits the cavity primarily through the vent exit openings 58. It is to be understood that a portion of the air also exits through the openings 46 of each of the microwave suppression tunnels 38 and 40. Return air ducts 94 and 96 then circulate air back toward and into a plenum 98. A portion of the air entering the plenum 98 is then exhausted to atmosphere through exhaust duct 100. The remaining portion of the air delivered to the plenum 98 by the return air ducts 94 and 96 is combined with fresh ambient air drawn in by the fan whereby the air is continuously refreshed and temperature and humidity within the cavity 20 can be controlled. The amount of air exiting the ventilation system 18 through the exhaust duct 100 is adjustably controlled by exhaust damper 102. The ability to control the amount of air thus exhausted beneficially provides up to five air exchanges per minute in the processing cavity, and as a result, accumulation of grease or condensed vapors on the articles 22 is reduced which, in the case of food items, may degrade its organoleptic properties.

Figure 1:
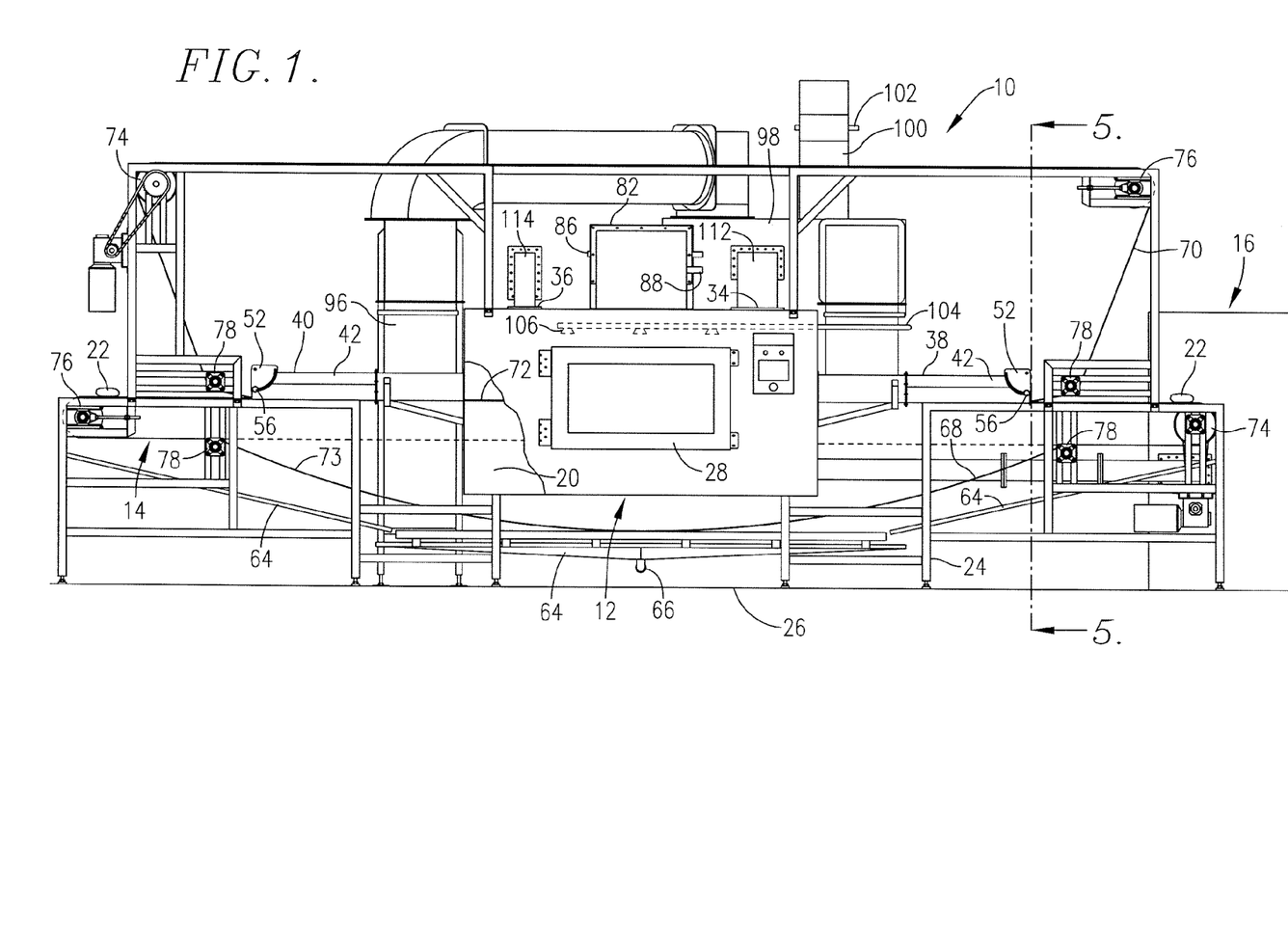
FIG. 1 is a front elevational view of a first embodiment of the oven hereof, showing the body of the oven, the conveyor, and the exhaust and intake ducts of the ventilation system.

In certain applications, it may be desirable to introduce product conditioners or additives, such as smoke or liquid flavorings directly onto the articles 22 moving along the conveyor belts, rather than introduce the flavorings through the conduit 88 positioned in the air inlet duct 82. In such circumstances, a pipe 104 provided with nozzles 106, shown in dashed lines in FIG. 1, may convey smoke or other flavorings directly into the cavity, and be connected to a suitable pressurizing source for spraying or otherwise introducing the additives. Because of the accumulation of condensates, flavorings or the like, the return air ducts 94 and 96 may be advantageously provided with removable and washable air filter elements.

Microwave source 16 preferably includes a microwave transmitter 108 which transmits microwave energy along a microwave tunnel 110. The microwave energy is divided into two microwave delivery channels 112 and 114 which transmit the microwaves to the respective microwave ports 34 and 36. For many food applications, the microwave transmitter may be a 75 kW transmitter operating at about 915 MHz, but it may be appreciated that other microwave capacities and frequencies may be employed depending on the particular item to be heated.

The frame 24 of the oven supports the oven body 12 and provides a suitable support for the microwave source 16, the conveyor 14, the ventilation system 18 and the drip pans. The frame 24 is preferably of stainless steel for ease of cleaning, and extends into the oven body 12 to provide support to the surrounding panels enclosing the cavity 20.

Figure 6:
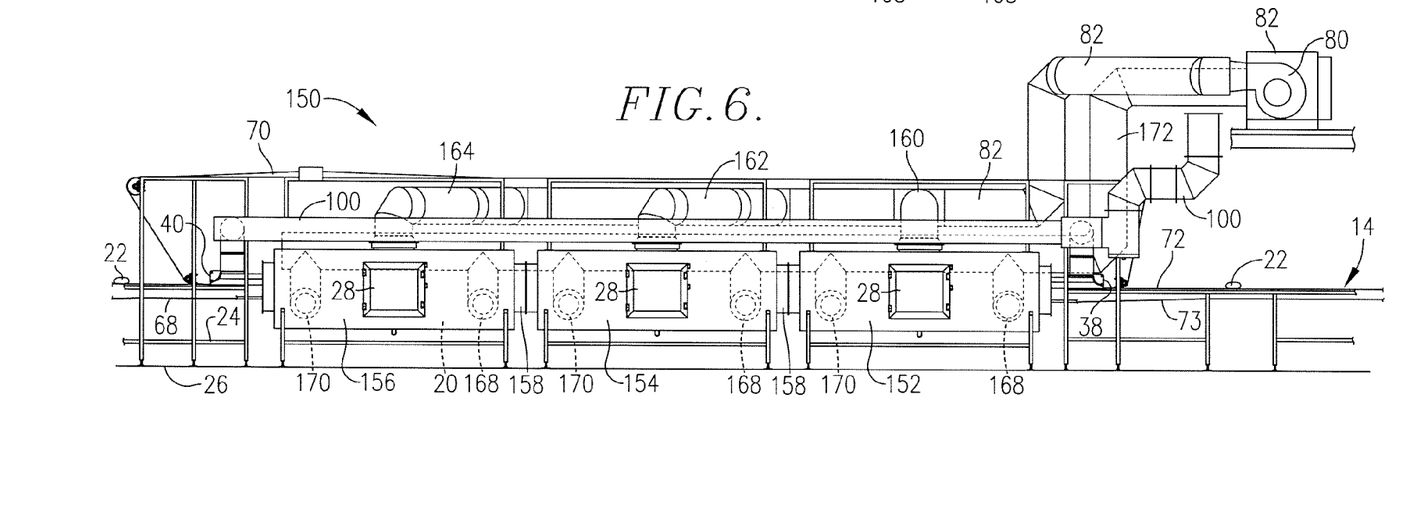
FIG. 6 is a front elevational view of an alternate embodiment of the oven hereof, with portions of the conveyor broken away, and showing a body having a plurality of in-line successively connected chambers, each having a heat inlet duct and a return duct, and also showing an exhaust duct.
Figure 7:
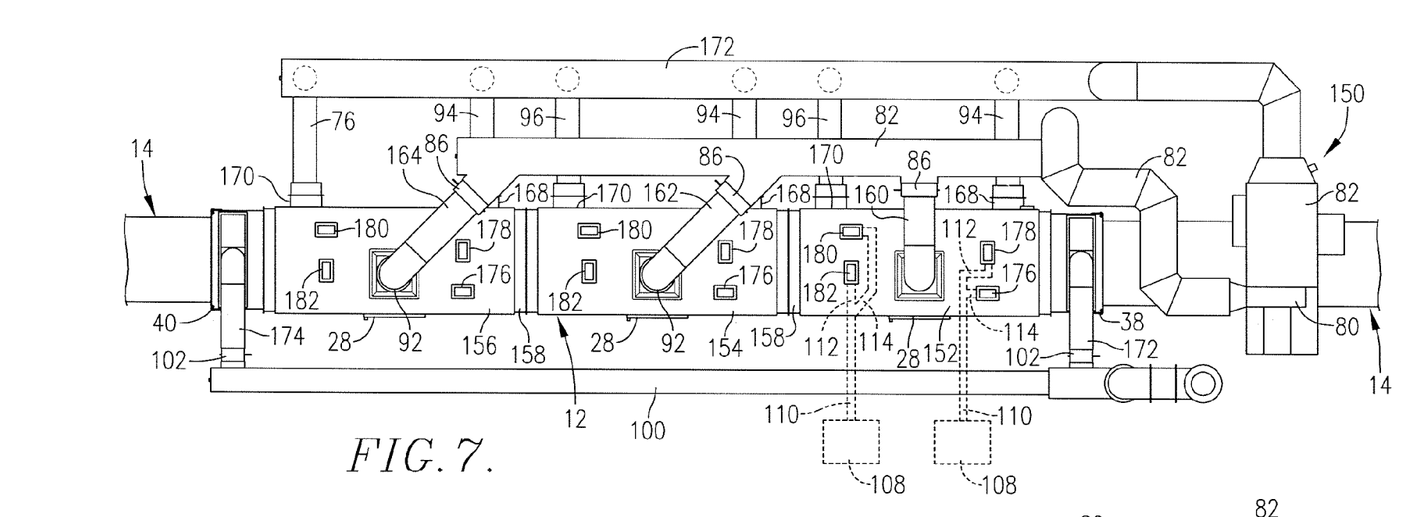
FIG. 7 is a top plan view of the oven of FIG. 6, with the length of the portion of the return ducts and exhaust air ducts leading into the respective chambers exaggerated for clarity, and showing the dampers on the heat inlet and exhaust ducts.

An alternate oven 150 having increased throughput and capacity is shown in FIGS. 6 and 7. While the oven 150 has many of the same characteristics of the oven 10, certain modifications are made in the embodiments shown. It is to be understood that for the sake of clarity, the conveyors and associated framework have not been illustrated to their full length in the oven 150, but rather the length of such components will be well understood by those skilled in the art from the foregoing description of the oven 10. One characteristic feature of the oven 150 is that the oven body 12 includes three chambers 152, 154, and 156 which comprise the oven body 12, and that the chambers 152 and 154 as well as chambers 154 and 156 are connected by adapters 158 whereby the cavity 20 extends continuously through the chambers. The conveyor 14 includes a lower belt 68 and an upper belt 70 as in oven 10, but the return portion 73 of the lower belt is configured so that a substantial part thereof passes within the oven cavity 20 to reduce stress on the belt due to changes in temperature.

The ventilation system 18 is also modified to accommodate the increased size and capacity of the oven 150 relative to oven 10. The fan 80 introduces air into the heater 82, which may be a 1000 kW electric heater or a gas heater, and blows air to the chambers 152, 154 and 156 through air inlet duct 82 which has delivery ducts 160, 162 and 164 for each respective chamber, each of the delivery ducts having a controllable damper 86 thereon for controlling the flow of heated air delivered to each of the chambers for the purpose of convection heating. The heated air from the delivery ducts enters each of the chambers of the body 12 through an air inlet opening 92 substantially centrally located on the intersection of the longitudinal axis of the chambers and the transverse axis of the chambers as described above with respect to oven 10. The air inlet opening is provided with a microwave choke 60 as described above. In the ventilation system 18 of the oven 150, each of the chambers 152, 154 and 156 is provided with longitudinally spaced return openings 168 and 170 along one side of the oven 150 which have corresponding return air ducts 94 and 96 which fluidically connect to the fan and heater by a common return duct 172 The return openings 168 and 170 are provided with microwave chokes 60 as described above. Because of the increase air flow required for the larger cavity 20 of the oven 150, the exhaust duct 100 is provided separately from the air return ducts and includes an upstream exhaust duct 172 which connects to the upstream microwave suppression tunnel 38 positioned at the upstream end of the chamber 152 where articles 22 initially enter the cavity 20, and a downstream exhaust duct 174 which connects to the downstream microwave suppression tunnel 40 where articles 22 exit from the cavity 20. Each of the upstream exhaust duct 172 and the downstream exhaust duct 174 are connected to vent exit openings 58 provided with microwave chokes 60 as described above, and further are provided with a controllable exhaust damper 102 which thereby controls conditions of air recirculation, temperature and humidity within the oven 150 by regulating the amount of air to be exhausted to the atmosphere through the exhaust duct 100. It is to be understood that Microwave energy is provided in combination with convection heating by microwave source 16. In order to provide satisfactory microwave energy for the oven 150 having multiple chambers and to increase throughput, each chamber 152, 154 and 156 is provided with a pair of microwave transmitters 108, such as, for example, a 75 kw transmitter operating at 915 MHz. Each transmitter 108 is operatively connected to the oven cavity 20 by a microwave tunnel 110 or other waveguide having delivery channels 112 and 114 which lead to microwave ports 176, 178, 180 and 182. The transmitters, microwave tunnel and delivery channels are shown only schematically in phantom lines with respect to chamber 152 in FIG. 7 for purposes of clarity, but it is to be understood that chambers 154 and 156 also have respective transmitters, tunnels and channels leading to the ports as shown thereon. Preferably, the ports are elongated in either the longitudinal or transverse direction relative to the longitudinal extent of the body 12 of the oven 150, to provide improved distribution of microwave energy through the oven, so that two of the microwave ports for each chamber are oriented with their greatest dimension parallel to the longitudinal axis of the oven and two ports are oriented with their greatest dimension transverse to the longitudinal axis of the oven, two microwave ports are positioned upstream of the air inlet opening 92 and the transverse axis of the chamber, and two ports are positioned downstream of the air inlet opening and the transverse axis of the chamber, and two microwave ports are positioned on a proximate side of the longitudinal axis of the oven and two ports are positioned on a remote side of the longitudinal axis of the oven, shown for example in FIG. 7.

In use, all of the controls for operating the oven may be manually set or regulated. Alternatively, a programmable logic controller 184 may be used to control the conveyor speed by providing signals to the conveyor motor drives 74, and may regulate the output of the volumetric heating source such as sending signals to the microwave transmitters 108. In addition, the programmable logic controller 184 is preferably connected to the heater 82 which signals when the oven is ready for operation, and may be operatively connected to communicate with processing stations for preparing the articles 22 for delivery to the oven 10 or 150 or receiving the heated articles 22 therefrom to ensure coordination of throughput. In this instance, the control of the dampers, the settings for the fan 80 and heater 82, and the operation of valves (not shown) for regulating the introduction of flavorings including liquid flavorings or smoke, treatment agents, or moisture are manual rather than automated. The programmable logic controller 184 could also be operatively connected to sensors for cavity and ambient temperature, moisture, airflow, conveyor speed, article weight and the like, and receiving signals therefrom used to control also the other operating components such as the fan 80, heater 82, dampers, conveyor motor drives 74, valves (not shown) which control the introduction of moisture and flavorings (including smoke) introduced through conduit 88, and microwave transmitters 108. As an example of a programmable logic controller 184, a Model SLC-504 by the Allen Bradley Company, a division of Rockwell Automation of Milwaukee, Wis. The controller 184 may be programmed according to the capacities of the transmitters 108, fan 80, heater 82, nature of the articles 22 to be heated, and ambient conditions of temperature and humidity to regulate the transmitters, fan, heater, conveyor motor drives and dampers and valves controlling the introduction of moisture, smoke or other flavorings into the cavity 20.

By way of example, where the articles 22 are sides of bacon either sliced or unsliced, it may be desirable to partially cook (parcook) the bacon to about 46% of its original weight, or more fully cook the bacon to a condition where it may be heated and served, in which instance the bacon is cooked to about 25% of its original weight. In this example, the bacon articles 22 may enter the oven 10 or 150 after having been cured either by the conventional process of immersing it in a curing solution of salt water, nitrates, nitrates and a flavoring, then hung and smoked at a temperature of about 130° F. to 140° F. for a period of time such as three days, or cured by other processes such as those as disclosed in U.S. Pat. Nos. 4,957,756, 5,567,460, and 6,669,974, the disclosures of which are incorporated herein by reference. In this regard, the cured bacon articles 22 are introduced into the oven 10 or 150 typically at a temperature ranging from about 15° F. to about 25° F. Air is heated by the heater and introduced into the oven cavity 20 so that the temperature of the air within the cavity is within a range of about 350° F. to about 500° F. Further, the ventilation system generates a sufficient flow to cause conduction or impingement cooking of the articles, that is, the fan causes the air entering through the air inlet opening 92 to move at an airspeed of about 5000 feet per minute to about 15,000 feet per minute. This combination of airflow and temperature is intended to provide satisfactory air convection and impingement heating to the articles 22 moving along the conveyor. Additional heating of the articles 22 is accomplished by the absorption of microwave energy. In the example of cooking bacon, which gives off considerable moisture and grease vapors during either parcooking or full cooking, it is desirable that the amount of air exhausted from the ventilation system 18 and through openings in the oven body 12 achieve a total of at least about 5, and preferably 15, air exchanges per minute. This is provided by the fan capacity, which in the instance of a single chamber oven 10 is about 5000 cfm, while in a larger oven such as oven 150 having multiple chambers, is about 15,000 cfm. Such a number of air exchanges is beneficial in limiting the buildup of grease or other condensates in the cooking process. The ability to discharge grease drippings or condensates from the oven body 12 to drip pans 64 further limits the buildup of condensates on the articles 22 or the oven body 12. In addition, it has been found desirable during the parcooking or fully cooking of bacon to control the humidity within the cavity 20 within a range of about 30% to 50% relative humidity so that the bacon has acceptable organoleptic properties. To that end, additional moisture in the form of water or flavoring solutions may be introduced by the conduit 88. In regard to bacon, for example, articles 22 introduced into the oven 10 or 150 hereof may exit as acceptable parcooked or fully cooked bacon with a residence time within the cavity 20 of the oven body ranging between 50 seconds and 120 seconds.

By way of example, articles 22 in the form of unsliced bacon sides weighing on average 12 lbs. at entry were introduced into oven 10 at the upstream end onto the lower belt 68 of the conveyor 14 which was controlled to move at about 10 feet per minute but could be increased to as much as 60 feet per minute in longer ovens such as oven 150. The residence time of the articles within the cavity 20 of the oven 10 was about 50 seconds. The heater 82 operated to produce a temperature of about 450° F. within the oven and the fan 80 operated at about 3500 cfm to generate about 11 air exchanges per minute. Microwave energy was supplied at 50 kW by the transmitter at about 915 MHz. Test showed the microwave levels measured at about 1 meter from the tunnel opening 46 of suppression tunnel 38 were about 5 μW. The bacon sides leaving the oven body 12 from the downstream end were examined and weighed to determine the level of cooking. It was found that the weight of the cooked articles was after cooling, on average, 38% of their original weight. The cooled bacon was sliced, heated and tasted and found to be acceptable in taste, texture and appearance.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. An oven for heating articles placed therein, comprising:
   a body defining a cavity therein adapted to receive articles for heating, wherein said body includes an upstream volumetric heating energy suppression tunnel and a downstream volumetric heating energy suppression tunnel;
   a conveyor oriented to move the articles in a longitudinal path through the cavity from an upstream end of the conveyor to a downstream end of the conveyor, said conveyor including a belt oriented for conveying the articles into said upstream volumetric heating energy suppression tunnel, into said cavity, and out of said downstream volumetric heating energy suppression tunnel;
   a volumetric heating source for delivering volumetric heating energy to the cavity;
   a thermal heater for heating air; and
   an air circulation and ventilation system including a fan and ducting operatively coupled to the fan for delivering air from the heater to the cavity and for returning at least a portion of the air from the cavity to the fan, said air circulation and ventilation system including at least one volumetric heating energy choke for inhibiting the entry of volumetric heating energy from the cavity into the ducting of the air circulation and ventilation system and at least one exhaust fluidically connected to the cavity, said exhaust being fluidically connected to a damper which is shiftable to control the flow of air exhausted to the ambient atmosphere from the exhaust,
   wherein said upstream volumetric heating energy suppression tunnel and said downstream volumetric heating energy suppression tunnel each include a plurality of pins oriented transverse to said longitudinal path.

2. An oven as set forth in claim 1, wherein at least one of said upstream volumetric heating energy suppression tunnel and said downstream volumetric heating energy suppression tunnel includes a guard, said guard including a member transversely oriented relative to said longitudinal path shiftably mounted for position between an open and a close position.

\* \* \* \* \*